United States Patent
Drumright et al.

(10) Patent No.: US 9,670,310 B2
(45) Date of Patent: Jun. 6, 2017

(54) HETEROGENEOUS ADVANCED EPOXY RESIN

(71) Applicant: BLUE CUBE IP LLC, Midland, MI (US)

(72) Inventors: Ray Drumright, Midland, MI (US); Peter Margl, Midland, MI (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

(21) Appl. No.: 15/102,735

(22) PCT Filed: Dec. 8, 2014

(86) PCT No.: PCT/US2014/069051
§ 371 (c)(1),
(2) Date: Jun. 8, 2016

(87) PCT Pub. No.: WO2015/094754
PCT Pub. Date: Jun. 25, 2015

(65) Prior Publication Data
US 2016/0311966 A1     Oct. 27, 2016

Related U.S. Application Data

(60) Provisional application No. 61/917,080, filed on Dec. 17, 2013.

(51) Int. Cl.
*C08G 59/24* (2006.01)
*C08G 59/62* (2006.01)

(52) U.S. Cl.
CPC ......... *C08G 59/245* (2013.01); *C08G 59/621* (2013.01)

(58) Field of Classification Search
CPC .................................................... C08G 59/24
USPC ........................................................... 528/87
See application file for complete search history.

(56) References Cited

FOREIGN PATENT DOCUMENTS

WO    WO 2008/045894    *    4/2008

* cited by examiner

*Primary Examiner* — Duc Truong
(74) *Attorney, Agent, or Firm* — Polsinelli PC

(57) ABSTRACT

Embodiments of the present disclosure are directed to heterogeneous advanced epoxy resins formed by reacting a mononuclear aromatic diglycidyl ether and a diphenol, more specifically, embodiments of the present disclosure are directed to heterogeneous advanced epoxy resins formed by reacting the mononuclear aromatic diglycidyl ether and the diphenol in a molar ratio of the mononuclear aromatic diglycidyl ether to the diphenol in a range from 1.5 to 1.0 to 5.0 to 1.0.

12 Claims, No Drawings

HETEROGENEOUS ADVANCED EPOXY RESIN

FIELD OF DISCLOSURE

Embodiments of the present disclosure are directed to epoxy resins. More particularly, embodiments of the present disclosure are directed to heterogeneous advanced epoxy resins.

BACKGROUND

Epoxy resins are reactive compounds, e.g., monomers or, oligomers, and/or polymers that contain epoxide groups. Epoxy resins may be reacted, which can be referred to as cross-linking or curing, to form a cured material, such as a cured coating. These cured materials are desirable for some applications due to improved mechanical properties and/or improved chemical resistance as compared to some other materials.

For some coating applications, epoxy resins that yield a cured coating with a relatively low crosslink density that can improve flexibility, adhesion, and/or impact resistance are desirable. This can be important on articles that flex, such as metal structures (e.g., bridges, storage tanks, vehicles). Some diglycidyl ether based coatings are not useful for these applications, as they can have a high crosslink density and are used on rigid substrates such as those made of concrete.

To achieve cured coatings with lower crosslink densities, higher molecular weight epoxy resins can be used. However, when higher molecular weight epoxy resins are crosslinked through terminal epoxy groups, there is a greater distance between crosslink points than for lower molecular weight liquid epoxy resins. The higher molecular weight epoxy resins can have a viscosity that results in challenges associated with applicability (e.g., the high molecular weight epoxy resin can be too viscous to be applied as desired).

The viscosity of the epoxy resin can be reduced through viscosity reducing techniques that use solvents, diluents, and/or heated application equipment. However, use of solvents (e.g., xylene) is not always desirable, as they are considered volatile organic compounds (VOCs), as they evaporate when used. Use of diluents, such as organic compounds with active hydrogens (e.g., benzyl alcohol) or epoxy functional compounds such as cresol glycidyl ether or butanediol diglycidyl ether, can be incompletely reacted into the epoxy coating during cure, resulting in VOCs and/or deteriorization in properties in the final coating due to disruption of crosslinking and/or plasticization. Heated application equipment, which can also be utilized to reduce viscosity, can be impractical due to costs associated with acquisition and maintenance.

Without the use of added solvents, diluents, and/or heated application equipment, however, the epoxy resin may have a viscosity that is too high for application. It is therefore desirable to provide a higher molecular weight epoxy resin with a lower viscosity to reduce use of solvents, diluents, and/or heated application equipment, for example.

SUMMARY

The present disclosure provides a heterogeneous advanced epoxy resin formed by reacting a mononuclear aromatic diglycidyl ether and a diphenol in a molar ratio of the mononuclear aromatic diglycidyl ether to the diphenol in a range from 1.5 to 1.0 to 5.0 to 1.0, wherein the mononuclear aromatic diglycidyl ether is selected from the group consisting of an alkyl hydroquinone diglycidyl ether, an alkyl resorcinol diglycidyl ether, an alkyl catechol diglycidyl ether, and combinations thereof.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The heterogeneous advanced epoxy resins, as disclosed herein, which are formed by reacting a mononuclear aromatic diglycidyl ether selected form the group consisting of an alkyl hydroquinone diglycidyl ether, an alkyl resorcinol diglycidyl ether, an alkyl catechol diglycidyl ether, and combinations thereof and a diphenol in a range from 1.5 to 1.0 to 5.0 to 1.0, have a higher predisposition to be in a liquid phase. This is compared to epoxy resin compositions that are advanced from diglycidyl ethers that are not selected from the group consisting of an alkyl hydroquinone diglycidyl ether, an alkyl resorcinol diglycidyl ether, and an alkyl catechol diglycidyl ether.

A higher predisposition to be in the liquid phase can be evidenced by glass transition temperature (Tg). For example, a composition having a lower glass transition temperature will have a higher predisposition to be in a liquid phase, relative to another composition's transition temperature.

As such, embodiments can provide a heterogeneous advanced epoxy resin that has a viscosity that is suitable for application with a reduction in use of viscosity reducing techniques (e.g., addition of solvent), as compared to some epoxy resin compositions that are advanced from diglycidyl ethers that are not selected from the group consisting of an alkyl hydroquinone diglycidyl ether, an alkyl resorcinol diglycidyl ether, an alkyl catechol diglycidyl ether. For instance, embodiments of the present disclosure can provide a heterogeneous advanced epoxy resin that is a flowable liquid at 25 degrees Celsius (° C.), which can indicate that the viscosity is suitable for application. Embodiments of the present disclosure provide a heterogeneous advanced epoxy resin that has a viscosity of less than 100,000 centipoise (cp) at 25° C. For example, the heterogeneous advanced epoxy resin can have a viscosity in a range from 300 to 100,000, 500 to 50,000, or 1,000 to 10,000 at 25° C. Heterogeneous advanced epoxy resins having a viscosity in the range discussed herein are useful for coatings, for example.

Embodiments of the present disclosure can provide a glass transition temperature that is less than 44° C. when the molar ratio of the mononuclear aromatic diglycidyl ether to the diphenol is 1.5 to 1.0, less than 29° C. when the molar ratio of the mononuclear aromatic diglycidyl ether to the diphenol is 2.0 to 1.0, and less than 18° C. when the molar ratio of the mononuclear aromatic diglycidyl ether to the diphenol is 2.5 to 1.0. Heterogeneous advanced epoxy resins having a glass transition temperature in the range discussed herein are useful for coatings.

Embodiments of the present disclosure provide that the heterogeneous advanced epoxy resin can be formed by reacting a mononuclear aromatic diglycidyl ether and a diphenol. The mononuclear aromatic diglycidyl ether can be defined as a structure that has two glycidyl ethers attached to a single aromatic ring. Examples of the mononuclear aromatic diglycidyl ether include alkyl hydroquinone diglycidyl ethers, alkyl resorcinol diglycidyl ethers, alkyl catechol diglycidyl ethers, and combinations thereof. Examples of the alkyl resorcinol diglycidyl ether include, but are not limited to, 4-hexyl resorcinol diglycidyl ether, 5-pentyl resorcinol diglycidyl ether, 4-ethyl resorcinol diglycidyl ether, tert-butyl resorcinol diglycidyl ether, 2-n-propyl resorcinol diglycidyl ether, 4-(2-octyl) resorcinol diglycidyl ether, and 4-styryl resorcinol diglycidyl ether. An example of the alkyl hydroquinone diglycidyl ether includes, but is not limited to, tert-butyl hydroquinone diglycidyl ether. An example of the alkyl catechol diglycidyl ether includes, but is not limited to, tert-butyl catechol diglycidyl ether. In contrast to mononuclear aromatic diglycidyl ethers, aromatic diglycidyl ethers such as bisphenol F diglycidyl ether have glycidyl ethers attached to different aromatic rings and thus are not mononuclear.

Surprisingly, not all heterogeneous advanced epoxy resins can provide a viscosity or glass transition temperature in ranges provided by embodiments of the present disclosure. Heterogeneous advanced epoxy resins that include an aromatic diglycidyl ether that is not mononuclear may provide a heterogeneous advanced epoxy resin with a higher viscosity and a higher glass transition temperature than embodiments of the present disclosure.

As mentioned, the heterogeneous advanced epoxy resins disclosed herein can be formed by reacting a mononuclear aromatic diglycidyl ether and a diphenol. Some embodiments of the present disclosure provide that the mononuclear aromatic diglycidyl ether can include an alkyl group that is a substituted or an unsubstituted alkyl group having 2 to 18 carbons.

Examples of the diphenol include, but are not limited to bisphenols, hydroquinones, such as alkyl hydroquinones, resorcinols such as alkyl resorcinols, catechols such as alkyl catechols, and combinations thereof Examples of bisphenols include, but are not limited to bisphenol A and bisphenol F. Examples of hydroquinones include, but are not limited to, hydroquinone and tert-butyl hydroquinone. Examples of resorcinols include, but are not limited to, resorcinol, 4-ethyl resorcinol, 4-hexyl resorcinol, and 2-n-propyl resorcinol. Examples of the catechols include, but are not limited to catechol and tert-butyl catechol.

Some embodiments of the present disclosure provide that the diphenol can be substituted or unsubstituted with an alkyl having 2 to 18 carbons, which can be unsaturated. In addition, the alkyl can be a branched alkyl and/or can contain pendant aromatic groups.

Embodiments of the present disclosure can include reacting the mononuclear aromatic diglycidyl ether and the diphenol in a molar ratio of the mononuclear aromatic diglycidyl ether to the diphenol in a range from 1.5 to 1.0 to 5.0 to 1.0. The range from 1.5 to 1.0 to 5.0 to 1.0 provides that mononuclear aromatic diglycidyl ether is in excess to the diphenol (e.g., to provide excess epoxide groups for reaction). Reacting the diphenol with an excess of mononuclear aromatic diglycidyl ether, and thus excess epoxide groups, can help provide that an epoxide-terminated polymer is formed.

As mentioned, the molar ratio of the mononuclear aromatic diglycidyl ether to the diphenol can have a range from 1.5 to 1.0 to 5.0 to 1.0. All individual values and subranges from and including 1.5 to 1.0 to 5.0 to 1.0 are included; for example, the molar ratio of the mononuclear aromatic diglycidyl ether to the diphenol can be from a lower limit of 1.5 to 1.0, 1.7 to 1.0, or 2.0 to 1.0 to an upper limit of 5.0 to 1.0, 3.5 to 1.0, or 2.5 to 1.0. Specific examples include a molar ratio of the mononuclear aromatic diglycidyl ether to the diphenol in a range from 1.5 to 1.0 to 3.5 to 1.0, 1.5 to 1.0 to 2.5 to 1.0, 1.7 to 1.0 to 5.0 to 1.0, 1.7 to 1.0 to 3.5 to 1.0, 1.7 to 1.0 to 2.5 to 1.0, 2.0 to 1.0 to 5.0 to 1.0, 2.0 to 1.0 to 3.5 to 1.0, 2.0 to 1.0 to 2.5 to 1.0.

Embodiments of the present disclosure provide that the diphenol and the mononuclear aromatic diglycidyl ether are derived from different root phenolic species. Different root species for deriving the diphenol and the mononuclear aromatic diglycidyl ether provides that the advanced epoxy resin is heterogeneous. For instance, when the mononuclear aromatic diglycidyl ether is 4-hexyl resorcinol diglycidyl ether, the diphenol can have a different root phenolic species such as 2-n-propyl resorcinol. In contrast to heterogeneous advanced epoxy resins, homogeneous advanced epoxy resins are formed from the same root phenolic species. Reaction of the mononuclear aromatic diglycidyl ether with the diphenol, where each are derived from different root phenolic species results in a heterogeneous advanced epoxy resin that has a comparatively large spacing between epoxide groups when compared to the mononuclear aromatic diglycidyl ether. Advantageously, this can result in less brittleness when the heterogeneous advanced epoxy resin is cured, as compared to a cured material formed from the mononuclear aromatic diglycidyl ether.

Some embodiments of the present disclosure provide a heterogeneous advanced epoxide resin that has an epoxide equivalent weight (EEW) in a range from 180 to 750 grams/equivalent (g/eq). The EEW is defined as the mass (g) of resin per mole of epoxide functional groups.

As mentioned, the EEW can be in a range from 180 to 750 g/eq. All individual values and subranges from and including 180 to 750 g/eq are included; for example, the EEW can be from a lower limit of 180, 190, 200, 225, 250, 300, 350, or 400 g/eq to an upper limit of 750, 725, 700, 675, 650, 625, 600, or 500 g/eq. Specific examples include an EEW in a range from 180 to 725 g/eq, 180 to 700 g/eq, 180 to 675 g/eq, 180 to 650 g/eq, 180 to 625 g/eq, 180 to 600 g/eq, 180 to 500 g/eq, 190 to 750 g/eq, 190 to 725 g/eq, 190 to 700 g/eq, 190 to 675 g/eq, 190 to 650 g/eq, 190 to 625, 190 to 600 g/eq, 190 to 500 g/eq, 200 to 750 g/eq, 200 to 725 g/eq, 200 to 700 g/eq, 200 to 675 g/eq, 200 to 650 g/eq, 200 to 625 g/eq, 200 to 600 g/eq, 200 to 500 g/eq, 225 to 750 g/eq, 225 to 725 g/eq, 225 to 700 g/eq, 225 to 675 g/eq, 225 to 650 g/eq, 225 to 625 g/eq, 225 to 600 g/eq, 225 to 500 g/eq, 250 to 750 g/eq, 250 to 725 g/eq, 250 to 700 g/eq, 250 to 675 g/eq, 250 to 650 g/eq, 250 to 625 g/eq, 250 to 600 g/eq, 250 to 500 g/eq, 300 to 750 g/eq, 300 to 725 g/eq, 300 to 700 g/eq, 300 to 675 g/eq, 300 to 650 g/eq, 300 to 625 g/eq, 300 to 600 g/eq, 300 to 500 g/eq, 350 to 750 g/eq, 350 to 725 g/eq, 350 to 700 g/eq, 350 to 675 g/eq, 350 to 650 g/eq, 350 to 625 g/eq, 350 to 600 g/eq, 350 to 500 g/eq, 400 to 750 g/eq, 400 to 725 g/eq, 400 to 700 g/eq, 400 to 675 g/eq, 400 to 650 g/eq, 400 to 625 g/eq, 400 to 600 g/eq, or 400 to 500 g/eq.

Embodiments of the present disclosure can include reacting the mononuclear aromatic diglycidyl ether and the diphenol in the presence of a catalyst. Examples of the catalyst can include, but are not limited to inorganic bases, tertiary amines, quaternary ammonium salts, and quaternary phosphonium salts. Specific examples of the catalyst can include, but are not limited to imidazole, ethyltriphenyl phosphonium acetate, and tetrabutylphosphonium bromide.

Embodiments of the present disclosure can include reacting the mononuclear aromatic diglycidyl ether and the diphenol at a temperature in a range from 135° C. to 250° C.

All individual values and subranges from and including 135 to 250° C. are included; for example, the temperature can be from a lower limit of 135, 145, or 155° C. to an upper limit of 250, 225, 190, or 180° C. Specific examples include a temperature in a range from 135 to 225° C., 135 to 190° C., 135 to 180° C., 145 to 250° C., 145 to 225° C., 145 to 190° C., 145 to 180° C., 155 to 250° C., 155 to 225° C., 155 to 190° C., 155 to 180° C.

Embodiments of the present disclosure provide that the heterogeneous advanced epoxy resin can include one or more additives. Examples of the additive include, but are not limited to, extender, hiding, and anti-corrosive pigments, surfactants, antifoam agents, mar and slip reagents, corrosion inhibitors, elastomers, stabilizers, extenders, plasticizers, antioxidants, leveling or thickening agents, co-solvents, wetting agents, co-surfactants, reactive diluents, fillers, catalysts, and combinations thereof, among others. Different amounts of the one or more additives can be utilized for various applications, as is recognized by those skilled in the art.

As mentioned, the heterogeneous advanced epoxy resin disclosed herein can be utilized as a coating. For example, the heterogeneous advanced epoxy resin can be mixed with a curing agent and applied to a substrate to form a coated article and be cured, e.g. crosslinked, to provide a cured coating on the substrate. Examples of curing agents include but are not limited to multifunctional amines, thiols, phenolics, and carboxylic acids. Examples of the substrate include, but are not limited to, composites, concrete, metals and metal alloys, such as aluminum, steel, iron, and plastics, among others.

The heterogeneous advanced epoxy resin may be applied to the substrate by various methods; for example, via roller coating, spray coating, dip coating, wash coating, flow coating, draw down coating, and/or curtain coating, among others. The coating, e.g., the heterogeneous advanced epoxy resin applied to the substrate, may have a thickness in the range of 0.01 millimeter (mm) to 2 centimeters (cm). All individual values and subranges from 0.01 mm to 2 cm are included herein and disclosed herein; for example, the coating may have a thickness from a lower limit of 0.01 mm, 0.05 mm, 0.1 mm, 0.5 mm, 0.75 mm, or 1 mm, to an upper limit of 2 cm, 1.5 cm, or 1 cm. For example, the coating may have a thickness of 0.01 mm to 1.5 cm, 0.01 mm to 1 cm, 0.05 mm to 2 cm, 0.05 mm to 1.5 cm, 0.05 mm to 1 cm, 0.1 mm to 2 cm, 0.1 mm to 1.5 cm, 0.1 mm to 1 cm, 0.5 mm to 2 cm, 0.5 mm to 1.5 cm, 0.5 mm to 1 cm, 0.75 mm to 2 cm, 0.75 mm to 1.5 cm, 0.75 cm to 1 cm, 1 mm to 2 cm, 1 mm to 1.5 cm, or 1 mm to 1 cm.

The heterogeneous advanced epoxy resin that is applied to the substrate may be cured, e.g., to form a cured coating on the substrate. The heterogeneous advanced epoxy resin applied to the substrate may be cured at different temperatures and for different periods of time for various applications. For example, the heterogeneous advanced epoxy resin applied to the substrate may be cured at a temperature in a range of −20° C. to 375° C. for a period in a range from 5 seconds to 1 week. The cured coating formed from the heterogeneous advanced epoxy resin may have a thickness in the range of 0.01 mm to 2 cm. All individual values and subranges from 0.01 mm to 2 cm are included herein and disclosed herein; for example, the cured coating may have a thickness from a lower limit of 0.01 mm, 0.05 mm, 0.1 mm, 0.5 mm, 0.75 mm, or 1 mm, to an upper limit of 2 cm, 1.5 cm, or 1 cm. For example, the cured coating may have a thickness of 0.01 mm to 1.5 cm, 0.01 mm to 1 cm, 0.05 m to 2 cm, 0.05 mm to 1.5 cm, 0.05 mm to 1 cm, 0.1 mm to 2 cm, 0.1 mm to 1.5 cm, 0.1 mm to 1 cm, 0.5 mm to 2 cm, 0.5 mm to 1.5 cm, 0.5 mm to 1 cm, 0.75 mm to 2 cm, 0.75 mm to 1.5 cm, 0.75 cm to 1 cm, 1 mm to 2 cm, 1 mm to 1.5 cm, or 1 mm to 1 cm.

EXAMPLES

In the Examples, various terms and designations for materials were used including, for example, the following:

Diphenol (4,4'-bisphenol A, available from TCI America); diphenol (4,4'-bisphenol F, available from TCI America); diphenol (resorcinol, available from Sigma Aldrich); diphenol (hydroquinone, available from Sigma Aldrich); aromatic diglycidyl ether (bisphenol A diglycidyl ether, D.E.R. 332, available from The Dow Chemical Company); aromatic diglycidyl ether (bisphenol F diglycidyl ether, D.E.R. 354, available from The Dow Chemical Company); catalyst (ethyltriphenyl phosphonium acetate in methanol, available from Alfa Aesar); diphenol (4-hexyl resorcinol, available from Alfa Aesar); diphenol (4-ethyl resorcinol, available from Alfa Aesar); diphenol (2-n-propyl resorcinol, available from Alfa Aesar); diphenol (4-hexyl resorcinol, available from TCI America); diphenol (tert-butyl hydroquinone, available from TCI America); diphenol (5-pentyl resorcinol, available from Sigma Aldrich);); solvent (acetone, available from Sigma Aldrich); solvent (diethylene glycol monobutyl ether, available from Sigma Aldrich); lithium chloride (1Molar, available from Sigma Aldrich); solvent (ethanol, available from Sigma Aldrich); potassium hydrogen phthalate (available from Sigma Aldrich); glacial acetic acid (available from Sigma Aldrich); methylene chloride (available from Sigma Aldrich); tetraethylammonium bromide (20% WN in glacial acetic acid, available from La-Mar-Ka, Inc.); perchloric acid (0.1 moles in glacial acetic acid, available from La-Mar-Ka, Inc.); solvent (propylene glycol methyl ether, Dowanol PM, available from The Dow Chemical Company); epichlorohydrin (available from The Dow Chemical Company); sodium hydroxide (available from The Dow Chemical Company); ethyl acetate (available from Fisher Scientific).

The mononuclear aromatic diglycidyl ethers were prepared from corresponding mononuclear aromatic diphenols, sodium hydroxide, and epichlorohydrin. For instance, 4-hexylresorcinol diglycidyl ether was prepared from 4-hexylresorcinol; 4-ethylresorcinol diglycidyl ether from 4-ethylresorcinol; t-butylresorcinol diglycidyl ether from t-butylresorcinol, etc. The preparations of several mononuclear aromatic diglycidyl ethers are described below. Others were prepared analogously.

Mononuclear aromatic diglycidyl ether (4-ethyl resorcinol diglycidyl ether) was prepared as follows. A 500 mL 3-neck round bottom flask equipped with a condenser, addition funnel and septum under nitrogen was charged in order with: 4-ethyl resorcinol (10.0 g, 72.4 mmol), Dowanol PM solvent (76.9 mL), epichlorohydrin (226.8 mL), and water (4.2 mL). The colorless contents of the flask were then heated to 52° C. before addition of sodium hydroxide (20% solution, 26.1 g, 130.3 mmol). The contents of the flask were then stirred at 52° C. for an additional 2 hours. The contents of the flask were then cooled to 25° C. before transfer to a separatory funnel where a bottom aqueous layer and a precipitate were removed from a top organic layer. Organic layer was then returned to the flask and was heated to 52° C.; a second addition of sodium hydroxide (20% solution, 7.2 g, 36 2 mmol) was added dropwise over 10 minutes while maintaining at 52° C. The contents of the flask were then heated and stirred for 1 hour. The contents of the flask were then cooled to 25° C. before transferring the contents of the flask to a separatory funnel where a bottom aqueous layer and a precipitate were again removed from a top organic layer. Organic layer was then returned to the flask and was heated to 52° C. and a 3rd addition of sodium hydroxide (20% solution, 2.9 g, 14.5 mmol) was added dropwise over 10 minutes while maintaining the temperature at 52° C. The contents of the flask were then heated and stirred for 1 hour. The organic layer was then washed with water (3×250 mL) and concentrated via rotovap (Buchi Rotavapor), resulting in a yellow liquid. The yellow liquid was purified by flash chromatography. A first column was run with a gradient of 5-15% ethyl acetate in methylene chloride through a 330 g ReverlerisTM (W.R. Grace Scientific, Baltimore, Md.) silica column. The fractions of the first peak were combined and concentrated under reduced pressure and heat to yield the 4-ethyl resorcinol diglycidyl ether, which was observed to be a colorless liquid. Yield (10.2 g, 56.3%).

Mononuclear aromatic diglycidyl ether (tert-butyl resorcinol diglycidyl ether) was prepared as follows. A 500 mL 3-neck round bottom flask equipped with a condenser, addition funnel and septum under nitrogen was charged in order with: 2-tert-butyl hydroquinone (10.0 g, 60.2 mmol), Dowanol PM solvent (63.9 mL), epichlorohydrin (188.5 mL), and water (3.5 mL). The colorless contents of the flask were then heated to 52° C. before addition of sodium hydroxide (20% solution, 21.7 g, 108.3 mmol). The contents of the flask were then stirred at 52° C. for an additional 2 hours. The contents of the flask were then cooled to 25° C. before they was transferred to a separatory funnel where the bottom aqueous layer and the precipitate were removed from the top organic layer. Organic layer was then returned to the flask and was re-heated to 52° C. and a second addition of sodium hydroxide (20% solution, 6.0 g, 30.1 mmol) was added dropwise over 10 minutes while maintaining at 52° C. The reaction was then heated and stirred for 1 hour. The contents of the flask were then cooled to 25° C. before transferring the reaction mixture to a separatory funnel where the bottom aqueous layer and the precipitate were removed from the top organic layer. Organic layer was then returned to the flask and was reheated to 52° C. and a 3rd addition of sodium hydroxide (20% solution, 2.4 g, 12.0 mmol) was added dropwise over 10 minutes while maintaining at 52° C. The reaction was then heated and stirred for 1 hour. The organic layer was then washed with water (3×250 mL) and concentrated via rotovap (Buchi Rotavapor), resulting in a brown liquid. The brown liquid was then purified by flash chromatography. The first column was run with a gradient of 10-20% ethyl acetate in methylene chloride through a 330 g Revereris™ (Grace Scientific) silica column. The fractions of the second peak were combined and concentrated under reduced pressure and heat to yield tert-butyl resorcinol diglycidyl ether, which was observed to be a dark yellow liquid. Yield (13.2 g, 78.9%).

Mononuclear aromatic diglycidyl ether (octylresorcinol diglycidyl ether) was synthesized as follows. Resorcinol (125.0 g, 1.13 mol) was melted at 110° C. in a 3-neck, 500 mL round-bottom flask equipped with addition funnel, nitrogen and septum with needle(for steam venting) and heated to 150° C. (hot plate temp). Sulfuric acid (1.0 mL, 18.9 mmol) was then added to the contents of the flask. 2-octanol (60.2 mL, 378.4 mmol) was then added dropwise over 1h to the contents of the flask and heated for 30 minutes. The contents of the flask were then cooled to 90° C. and 100 mL of water and 100 mL of toluene were added. The contents of the flask were then transferred to a separatory funnel The dark red mixture was allowed to separate overnight. The bottom aqueous layer was drained off and the toluene layer in the separatory funnel was washed 2 more times with water (100 mL each). The toluene layer was then dried over magnesium sulfate and then concentrated under vacuum (rotovap). The resulting red liquid was then vacuum distilled at a temperature from 131-138° C. at 0.1 torr, resulting in a semi-viscous yellow liquid (octylresorcinol). Hot octylresorcinol (as prepared above, 35.5 g, 159.6 mmol) was added into a 1.5 L bottom drain glass jacketed reactor equipped with addition funnel, condenser, pneumatic stirring and nitrogen. Isopropanol (150 mL) was then added to rinse the residue from the funnel followed by epichlorohydrin (500 mL, 6.38 mol). Additional isopropanol (53 mL) was then added to rinse any residual epichlorohydrin through followed by DI water (47 mL). The reactor was heated to 52° C. via ethylene glycol/water circulation through a jacket. Sodium hydroxide (20% wt solution in water, 51.3 mL) was then added dropwise over 1 h. The contents of the reactor were then heated and stirred for 90 minutes before stopping stirring and allowing the contents of the reactor to sit. 70 mL of aqueous solution was drained from the bottom of the reactor before resuming stirring. Another addition of sodium hydroxide solution (28.5 mL) was then added to the contents of the reactor over 30 minutes. After another 60 minutes stirring was stopped, the contents of the reactor were allowed to sit for 15 minutes and the aqueous layer was drained off the bottom. After resuming stirring, a third sodium hydroxide addition (14.2 mL) was completed and the reaction was stirred for 30 minutes. The temperature on the bath was then lowered to 20° C. and the contents of the reactor were stirred for 30 minutes to cool. 400 mL of DI water was then added, stirred for 5 minutes and then stopped to allow the phases to separate overnight. The bottom, brown (epichlorohydrin) layer was drained and retained and the top water layer (pink) was wasted. The epichlorohydrin layer was then re-introduced into the reactor with 400 mL of water and stirred for 5 minutes before allowing for separation. After 30 minutes, the bottom, orange (epichlorohydrin) layer was drained and retained and the top water layer (pink) was wasted. The epichlorohydrin layer was then re-introduced again into the reactor with 400 mL of water and stirred for 5 minutes before allowing for separation. The bottom layer (yellow) was passed through a 150 mL Isolute Phase Separator column and concentrated under reduced pressure to yield an orange/red liquid. The liquid was then purified by vacuum distillation (169-175° C. @0.15 torr) to yield octyl-resorcinol diglycidyl ether, which was observed to be a yellow liquid. Yield (39.5 g, 74%).

Mononuclear aromatic diglycidyl ether (styryl resorcinol diglycidyl ether) was synthesized as follows. Resorcinol (75.0 g, 681 mmol) was heated to 120° C. in a 250 mL vial equipped with septa, nitrogen, and a thermocouple, where it melted. Concentrated sulfuric acid (610 µL, 11.4 mmol) was then added to the resorcinol causing a color change to purple. Styrene (26.1 mL, 227 mmol) was then added dropwise over 90 minutes to the contents of the vial. The contents of the vial were stirred for 30 minutes and cooled to 100° C. Water (50 mL) and toluene (50 mL) were added to the contents of the vial. The contents of the vial were then transferred to a 1 L separatory funnel and water and toluene were added (300 mL of each). The aqueous and organic layers were then separated, retaining the organic layer. The organic was washed 2×300 mL with water before drying over magnesium sulfate and concentrating under reduced pressure. The resulting orange liquid was then distilled (139-158° C. @0.015 torr) collecting 28.5 g of thick sap-like yellow liquid (styrene resorcinol). Hot styrene-resorcinol adduct (as prepared above, 34.2 g, 159.6 mmol) was added into a 1.5 L bottom drain glass jacketed reactor equipped with addition funnel, condenser, pneumatic stirring and nitrogen. Isopropanol (150 mL) was then added to rinse residue from the funnel followed by epichlorohydrin (Aldrich, 500 mL, 6.38 mol). A second addition of isopropanol (53 mL) was then added to rinse any residual epichlorohydrin through followed by DI water (47 mL). The reactor was heated to 52° C. via ethylene glycol/water circulation through jacket. Sodium hydroxide (20% wt solution in water, 51.3 mL) was then added dropwise over 1h. The reaction was then heated and stirred for an additional 90 minutes before stopping stirring and allowing the reaction to sit. 70 mL of aqueous solution was drained from the bottom of the reactor before resuming stirring. Another addition of sodium hydroxide solution (28.5 mL) was then added over 30 minutes. After another 60 minutes stirring was then stopped again, the solution was allowed to sit for 15 minutes and the aqueous layer was drained off the bottom. After resuming stirring, a third addition of sodium hydroxide (14.2 mL) was made and the contents of the reactor were stirred for 30 minutes. The temperature on the bath was then lowered to 20° C. and the contents of the reactor were stirred for 30 minutes to cool. 400 mL of DI water was then added, stirred for 5 minutes and then stopped to allow the phases to separate. The bottom, brown (epichlorohydrin) layer was drained and retained and the top water layer (yellow) was wasted. The epichlorohydrin layer was then re-introduced into the reactor with 400 mL of water and stirred for 5 minutes before allowing for separation once again. After 30 minutes, the bottom, yellow (epichlorohydrin) layer was drained and retained and the top water layer (yellow) was wasted. The epichlorohydrin layer was then re-introduced into the reactor with 400 mL of water and stirred for 5 minutes before allowing for separation overnight. After separating overnight, the bottom layer (yellow) was passed through a 150 mL Isolute Phase Separator column and concentrated under reduced pressure to yield an orange liquid. The liquid was then purified by vacuum distillation (240° C. @0.1 torr) to yield styryl resorcinol diglycidyl ether, which was observed to be an orange liquid. Yield (49.03 g).

Comparative Example A

Comparative Example A, a homogeneous advanced epoxy resin, was prepared as follows. Bisphenol A diglycidyl ether and 4,4'-bisphenol A (molar ratio of 1.5:1) were added to a container. Catalyst (0.1 weight percent (wt %) relative to the contents of the container) was added to the container and the contents were mixed. A portion of the contents of the container (1 milligram (mg)) were placed into a tray (hermetically sealed) and differential scanning calorimetry was performed on the contents of the tray with a TA DSCQ2000 calorimeter at 10° C. per minute from 21° C. to 200° C. to determine a reaction temperature. An exotherm indicated that the contents of the tray reacted at 170° C. The contents of the container were then reacted at 170° C. for 20 hours under stirring to prepare Comparative Example A. The diglycidyl ether, diphenol, reaction temperature, and reaction time for Comparative Example A is reported in Table I.

An epoxide equivalent weight (EEW) value for Comparative Example A was measured by EEW titrations on a Metrohm 800 Dosino titrator. The electrode of the titrator was stored in 1 molar (M) LiCl in ethanol. The titrator was calibrated by titrating 0.2 grams of potassium hydrogen phthalate in 60 mL of glacial acetic acid.

Comparative Example A was placed into a beaker, then methylene chloride (40 mL) and glacial acetic acid (20 mL) were added to the beaker until dissolved. Then, tetraethylammonium bromide solution (15 mL) was added. The contents of the beaker were then titrated with perchloric acid with endpoint determined electrochemically. The EEW for Comparative Example A is reported in Table I.

Comparative Example A was a viscous glass at 25° C. and a viscosity value could not be obtained.

Comparative Example A was placed in a container, then diethylene glycol monobutyl ether (60 wt % relative to the contents of the container) was added to form a Comparative Example A Solution, which was 40% solids. A viscosity value for the Comparative Example A Solution was measured using a Brookfield CAP 2000+ viscometer at 25° C. Spindle #6 was used with 30 microliters (µL) of liquid. The spindle speed was varied such as to keep the shear rate within the recommended range. The viscosity reading was taken after 40-60 seconds.

Glass transition temperature for Comparative Example A was determined by differential scanning calorimetry using a TA DSCQ2000 calorimeter. Differential scanning calorimetry was performed on Comparative Example A between −100° C. to 300° C. to detect the glass transition temperature. Comparative Example A was heated from 21° C. to 100° C. at a rate of 10° C./minute and maintained at 100° C. for 4 minutes. Comparative Example A was then cooled from 100° C. to −90° C. at a rate of 10° C./minute and kept at −90° C. for 4 minutes. Comparative Example A was then heated from −90° C. to 300° C. at a rate of 10° C./minute and data for the glass transition temperature was collected during the heating. The glass transition temperature for Comparative Example A is reported in Table I.

Comparative Example B

Comparative Example B was prepared as follows. Comparative Example B was prepared as Comparative Example A with the changes: bisphenol F diglycidyl ether was used instead of bisphenol A diglycidyl ether in a molar ratio of 1.5:1, which is reported in Table I. Additionally, the reaction for Comparative Example B was carried out utilizing a reaction temperature and reaction time reported in Table I. EEW, viscosity, and glass transition temperature for Comparative Example B was determined as Comparative Example A and are reported in Table I.

TABLE I

| Product | Diglycidyl ether Diglycidyl ether:Diphenol Molar Ratio (1.5:1) | Diphenol | Reaction Temperature (° C.) | Reaction Time (Hours) | Viscosity (Centipoise) Pure/Solution | EEW | Tg (° C.) |
|---|---|---|---|---|---|---|---|
| Comparative Example A | bisphenol A diglycidyl ether | 4,4'-bisphenol A | 170 | 20 | */341 | 837 | 51 |
| Comparative Example B | bisphenol F diglycidyl ether | 4,4'-bisphenol A | 175 | 20 | */214 | 860 | 44 |

*Indicates reaction product was a viscous glass at 25° C. and viscosity was not measured.

The data in Table I show that a viscous glass was formed from Comparative Examples A and B and viscosity measurements were not performed. The data in Table I shows that when a solvent was added to Comparative Examples A and B to form a Solution, a viscosity of 341 and 241 was measured. The data in Table I shows that the Tg for Comparative Examples A and B ranges from 44° C. to 51° C.

Comparative Examples C and D

Comparative Examples C and D were prepared as follows. Comparative Examples C and D were prepared as Comparative Example A with the changes: bisphenol A diglycidyl ether, bisphenol F diglycidyl ether, and 4,4'- bisphenol A in a molar ratio of 2:1, which is reported in Table II. Additionally, reactions for Comparative Examples C and D were carried out utilizing a reaction temperature and reaction time reported in Table II. EEW, viscosity, and glass transition temperature for Comparative Examples C and D were determined as Comparative Example A and are reported in Table II.

surements were not performed. The data in Table III shows that when a solvent was added to Comparative Examples E and F to form a Solution, a viscosity of 81 and 103 was measured. The data in Table III shows that the Tg for Comparative Examples E and F is 18° C.

TABLE II

| Product | Diglycidyl ether | Diphenol Diglycidyl ether:Diphenol Molar Ratio (2:1) | Reaction Temperature (° C.) | Reaction Time (Hours) | Viscosity (Centipoise) Pure/Solution | EEW | Tg (° C.) |
|---|---|---|---|---|---|---|---|
| Comparative Example C | bisphenol A diglycidyl ether | 4,4'-bisphenol A | 170 | 20 | */142 | 493 | 29 |
| Comparative Example D | bisphenol F diglycidyl ether | 4,4'-bisphenol A | 175 | 20 | */139 | 508 | 29 |

*Indicates reaction product was a viscous glass and viscosity at 25° C. was not measured.

The data in Table II show that a viscous glass was formed from Comparative Examples C and D and viscosity measurements were not performed. The data in Table II shows that when a solvent was added to Comparative Examples C and D to form a Solution, a viscosity of 142 and 139 was measured. The data in Table II shows that the Tg for Comparative Examples C and D is 29° C.

Comparative Examples E and F

Comparative Examples E and F were prepared as follows. Comparative Examples E and F were prepared as Comparative Example A with the changes: bisphenol A diglycidyl ether, bisphenol F diglycidyl ether, and 4,4'-bisphenol A in a molar ratio of 2.5:1, which is reported in Table III. Additionally, reactions for Comparative Examples E and F were carried out utilizing a reaction temperature and reaction time reported in Table III. EEW, viscosity, and glass transition temperature for Comparative Examples E and F were determined as Comparative Example A and are reported in Table III.

Examples 1-14—Heterogeneous Advanced Epoxy Resin

Heterogeneous advanced epoxy resins, Examples 1-14, were prepared as follows. Examples 1-14 were prepared as Comparative Example A utilizing mononuclear aromatic diglycidyl ethers including 4-hexyl resorcinol diglycidyl ether; 4-ethyl resorcinol diglycidyl ether; 2-n-propyl resorcinol diglycidyl ether; and 4-(2-octyl) resorcinol diglycidyl ether and diphenols including 4-ethyl resorcinol; 2-n-propyl resorcinol; 4-hexyl resorcinol; and tert-butyl hydroquinone in a molar ratio of 1.5:1, which are reported in Table IV. Additionally, reactions for Examples 1-14 were carried out utilizing a temperature and time reported in Table IV. EEW, viscosity, and glass transition temperature for Examples

TABLE III

| Product | Diglycidyl ether | Diphenol Diglycidyl ether:Diphenol Molar Ratio (2.5:1) | Reaction Temperature (° C.) | Reaction Time (Hours) | Viscosity (Centipoise) Pure/Solution | EEW | Tg (° C.) |
|---|---|---|---|---|---|---|---|
| Comparative Example E | bisphenol A diglycidyl ether | 4,4'-bisphenol A | 170 | 20 | */81 | 381 | 18 |
| Comparative Example F | bisphenol F diglycidyl ether | 4,4'-bisphenol A | 175 | 20 | */103 | 391 | 18 |

*Indicates reaction product was a viscous glass and viscosity at 25° C. was not measured.

The data in Table III show that a viscous glass was formed from Comparative Examples E and F and viscosity measurements were not performed. The data in Table III shows 1-14 were determined as Comparative Example A and are reported in Table IV.

TABLE IV

| Heterogeneous Advanced Epoxy Resin | Mononuclear aromatic diglycidyl Ether Mononuclear aromatic diglycidyl ether:Diphenol Molar Ratio (1.5:1) | Diphenol | Reaction Temperature (° C.) | Reaction Time (Hours) | Viscosity (centipoise) Pure/Solution | EEW | Tg (° C.) |
|---|---|---|---|---|---|---|---|
| Example 1 | 4-hexyl resorcinol diglycidyl ether | 4-ethyl resorcinol | 150 | 20 | */159 | 798 | 14 |
| Example 2 | 4-hexyl resorcinol diglycidyl ether | 2-n-propyl resorcinol | 150 | 20 | */111 | 758 | 7 |
| Example 3 | 4-hexyl resorcinol diglycidyl ether | 4-hexyl resorcinol | 150 | 20 | */88 | 800 | 8 |

TABLE IV-continued

| Heterogeneous Advanced Epoxy Resin | Mononuclear aromatic diglycidyl Ether Mononuclear aromatic diglycidyl ether:Diphenol Molar Ratio (1.5:1) | Diphenol | Reaction Temperature (° C.) | Reaction Time (Hours) | Viscosity (centipoise) Pure/Solution | EEW | Tg (° C.) |
|---|---|---|---|---|---|---|---|
| Example 4 | 4-hexyl resorcinol diglycidyl ether | tert-butyl hydroquinone | 150 | 20 | */136 | 667 | 18 |
| Example 5 | 4-ethyl resorcinol diglycidyl ether | 4-ethyl resorcinol | 170 | 7 | */54 | 736 | 31.5 |
| Example 6 | 4-ethyl resorcinol diglycidyl ether | 2-n-propyl resorcinol | 150 | 7 | */152 | 642 | 23.3 |
| Example 7 | 4-ethyl resorcinol diglycidyl ether | 4-hexyl resorcinol | 170 | 7 | */96 | 717 | 13 |
| Example 8 | 4-ethyl resorcinol diglycidyl ether | tert-butyl hydroquinone | 150 | 7 | */80 | 644 | 22.1 |
| Example 9 | 2-n-propyl resorcinol diglycidyl ether | 4-ethyl resorcinol | 170 | 5 | */Not Run | 677 | 25.9 |
| Example 10 | 2-n-propyl resorcinol diglycidyl ether | tert-butyl hydroquinone | 150 | 5 | */Not Run | 636 | 31.2 |
| Example 11 | 2-n-propyl resorcinol diglycidyl ether | 4-hexyl resorcinol | 170 | 5 | */Not Run | 682 | 11.4 |
| Example 12 | 4-(2-octyl) resorcinol diglycidyl ether | 4-ethyl resorcinol | 185 | 5 | */Not Run | 718 | 14.83 |
| Example 13 | 4-(2-octyl) resorcinol diglycidyl ether | 4-hexyl resorcinol | 185 | 5 | */Not Run | 799 | 7.09 |
| Example 14 | 4-(2-octyl) resorcinol diglycidyl ether | tert-butyl hydroquinone | 180 | 5 | */Not Run | 660 | 18.49 |

*Indicates reaction product was a viscous glass at 25° C. and viscosity was not measured.

The data in Table IV shows that for Examples 1-14, a heterogeneous advanced epoxy resin was provided that has a Tg that is lower than the Tg provided in Comparative Examples A and B. The lower Tg for Examples 1-14 suggests that the heterogeneous advanced epoxy resins have a higher predisposition to be in a liquid phase than Comparative Examples A and B. Although Comparative Example B is heterogeneous (e.g., bisphenol F diglycidyl ether and 4,4'-bisphenol A), bisphenol F diglycidyl ether is not a mononuclear aromatic diglycidyl ether.

As such, Examples 1-14 will provide a viscosity that is suitable for application when combined with a similar and/or lesser amount of solvent than Comparative Examples A and B. In addition, the data in Table IV show that when a solvent was added to Examples 1-8 to form a solution, a viscosity in a range from 54 to 159 was obtained, which is lower than the viscosity obtained for Comparative Examples A and B Solutions.

Examples 15-42—Heterogeneous Advanced Epoxy Resin

Heterogeneous advanced epoxy resins, Examples 15-42, were prepared as follows. Examples 15-42 were prepared as Comparative Examples C and D utilizing mononuclear aromatic diglycidyl ethers including 4-hexyl resorcinol diglycidyl ether; 4-ethyl resorcinol diglycidyl ether; tert-butyl hydroquinone diglycidyl ether; 5-pentyl resorcinol diglycidyl ether; 2-n-propyl resorcinol diglycidyl ether; and 4-(2-octyl) resorcinol diglycidyl ether and diphenols including 4-ethyl resorcinol; 2-n-propyl resorcinol; 4-hexyl resorcinol; 4,4'-bisphenol F, 4,4'-bisphenol A, resorcinol, hydroquinone, and tert-butyl hydroquinone in a molar ratio of 2:1, which are reported in Table V. Additionally, reactions for Examples 15-42 were carried out utilizing a temperature and time reported in Table V. EEW, viscosity, and glass transition temperature for Examples 15-42 were determined as Comparative Examples C and D and are reported in Table V.

TABLE V

| Heterogeneous Advanced Epoxy Resin | Mononuclear aromatic diglycidyl Ether | Diphenol | Reaction Temperature (° C.) | Reaction Time (Hours) | Viscosity (centipoise) | EEW | Tg (° C.) |
|---|---|---|---|---|---|---|---|
| Example 15 | 4-hexyl resorcinol diglycidyl ether | 4-ethyl resorcinol | 150 | 20 | N/M/58 | 459 | −3 |
| Example 16 | 4-hexyl resorcinol diglycidyl ether | 2-n-propyl resorcinol | 150 | 20 | 748,500/48 | 442 | −7 |
| Example 17 | 4-hexyl resorcinol diglycidyl ether | 4-hexyl resorcinol | 150 | 20 | N/M/61 | 471 | −9 |
| Example 18 | 4-hexyl resorcinol diglycidyl ether | tert-butyl hydroquinone | 150 | 20 | N/M/86 | 449 | −2 |
| Example 19 | 5-pentyl resorcinol diglycidyl ether | tert-butyl hydroquinone | 145 | 4 | N/M/44 | 444 | 1 |
| Example 20 | 5-pentyl resorcinol diglycidyl ether | 4-ethyl resorcinol | 150 | 4 | N/M/39 | 445 | −3 |
| Example 21 | 5-pentyl resorcinol diglycidyl ether | 4-hexyl resorcinol | 145 | 4 | N/M/39 | 497 | −10 |
| Example 22 | 4-ethyl resorcinol diglycidyl ether | 4-ethyl resorcinol | 170 | 7 | */54 | 433 | 10.7 |
| Example 23 | 4-ethyl resorcinol diglycidyl ether | 2-n-propyl resorcinol | 150 | 7 | */52 | 383 | 6.7 |
| Example 24 | 4-ethyl resorcinol diglycidyl ether | 4-hexyl resorcinol | 170 | 7 | N/M/56 | 415 | 1.1 |
| Example 25 | 4-ethyl resorcinol diglycidyl ether | tert-butyl hydroquinone | 150 | 7 | */56 | 427 | 13.7 |
| Example 26 | tert-butyl hydroquinone diglycidyl ether | 2-n-propyl resorcinol | 150 | 7 | */56 | 388 | 23.1 |
| Example 27 | tert-butyl hydroquinone diglycidyl ether | 4-hexyl resorcinol | 175 | 7 | */56 | 410 | 12.9 |
| Example 28 | 2-n-propyl resorcinol diglycidyl ether | 4-ethyl resorcinol | 170 | 5 | */Not run | 412 | 6.3 |
| Example 29 | 2-n-propyl resorcinol diglycidyl ether | tert-butyl hydroquinone | 150 | 5 | */Not run | 387 | 9.8 |
| Example 30 | 2-n-propyl resorcinol diglycidyl ether | 4-hexyl resorcinol | 170 | 5 | 1,230,000/Not run | 426 | −3.9 |
| Example 31 | 4-(2-octyl) resorcinol diglycidyl ether | 4-ethyl resorcinol | 185 | 5 | N/M/Not run | 451 | −2.41 |
| Example 32 | 4-(2-octyl) resorcinol diglycidyl ether | 4-hexyl resorcinol | 185 | 5 | 738,750/Not run | 472.6 | −20.22 |
| Example 33 | 4-(2-octyl) resorcinol diglycidyl ether | tert-butyl hydroquinone | 180 | 5 | */Not run | 429.2 | −1.43 |
| Example 34 | 4-ethyl resorcinol diglycidyl ether | tert-butyl hydroquinone | 150 | 7 | */56 | 427 | 13.7 |
| Example 35 | 4-ethyl resorcinol diglycidyl ether | 4-hexyl resorcinol | 170 | 7 | NM/56 | 415 | 1.1 |
| Example 36 | 4-ethyl resorcinol diglycidyl ether | 4,4'-bisphenol F | 170 | 7 | */73 | 403 | 12.4 |
| Example 37 | 4-ethyl resorcinol diglycidyl ether | 4,4'-bisphenol A | 170 | 7 | */42 | 415 | 12.7 |
| Example 38 | 4-hexyl resorcinol diglycidyl ether | 4,4'-bisphenol A | 170 | 20 | NM/69 | 441 | 2 |
| Example 39 | 4-hexyl resorcinol diglycidyl ether | 4,4'-bisphenol F | 175 | 20 | NM/67 | 463 | −2 |
| Example 40 | 4-hexyl resorcinol diglycidyl ether | resorcinol | 170 | 20 | NM/58 | 458 | −1 |
| Example 41 | 4-hexyl resorcinol diglycidyl ether | hydroquinone | 170 | 20 | NM/44 | 425 | −7 |
| Example 42 | 5-pentyl resorcinol diglycidyl ether | 4,4'-bisphenol A | 150 | 4 | NM/52 | 460 | 2 |

*Indicates reaction product was a viscous/glass at 25° C. and viscosity was not measured.
(N/M) Indicates reaction product was a liquid, but viscosity was too high to measure with Brookfield CAP 2000+ viscometer.

The data in Table V show that for Examples 16, 30, and 32, a heterogeneous advanced epoxy resin with a measureable viscosity (as measured with a Brookfield CAP 2000+ viscometer) was provided. Additionally, Examples that provided a heterogeneous advanced epoxy resin that was a viscous glass and did not have a measureable viscosity provided a Tg that is similar or lower to the Tg provided in Comparative Examples C and D. This suggests that the heterogeneous advanced epoxy resins that provided a viscous glass have a higher predisposition to be in a liquid phase than Comparative Examples C and D. Although Comparative Example D is heterogeneous (e.g., bisphenol F diglycidyl ether and 4,4'-bisphenol A), bisphenol F diglycidyl ether is not a mononuclear aromatic diglycidyl ether. As such, Examples 15-42 will provide a viscosity that is suitable for application when combined with a similar and/or lesser amount of solvent than Comparative Examples C through D. In addition, the data in Table V show that when a solvent was added to Examples 15-27 and Examples 34-42 to form a solution, a viscosity in a range from 39 to 86 was obtained, which is lower than the viscosity obtained for Comparative Examples C and D.

Examples 43-69—Heterogeneous Advanced Epoxy Resin

Heterogeneous advanced epoxy resins, Examples 43-69, were prepared as follows. Examples 43-69 were prepared as Comparative Examples E and F utilizing mononuclear aromatic diglycidyl ethers including 4-hexyl resorcinol diglycidyl ether; 4-ethyl resorcinol diglycidyl ether; tert-butyl hydroquinone diglycidyl ether; 5-pentyl resorcinol diglycidyl ether; 2-n-propyl resorcinol diglycidyl ether; and 4-(2-octyl) resorcinol diglycidyl ether and diphenols including 4-ethyl resorcinol; 2-n-propyl resorcinol; 4-hexyl resorcinol; 4,4'-bisphenol F, 4,4'-bisphenol A, hydroquinone, and tert-butyl hydroquinone in a molar ratio of 2.5:1, which are reported in Table VI. Additionally, reactions for Examples 43-69 were carried out utilizing a temperature and time reported in Table VI. EEW, viscosity, and glass transition temperature for Examples 43-69 were determined as Comparative Examples E and F and are reported in Table VI.

Viscosity values for Examples 43-69 at 25° C. were measured using a Brookfield CAP 2000+ viscometer. Spindle #6 was used with 30 µL of liquid. The spindle speed was varied such as to keep the shear rate within the recommended range. The viscosity reading was taken after 40-60 seconds.

TABLE VI

| Heterogeneous Advanced Epoxy Resin | Mononuclear aromatic diglycidyl Ether | Diphenol | Reaction Temperature (° C.) | Reaction Time (Hours) | Viscosity (centipoise) Pure/Solution | EEW | Tg (° C.) |
|---|---|---|---|---|---|---|---|
| | Mononuclear aromatic diglycidyl ether:Diphenol Molar Ratio (2.5:1) | | | | | | |
| Example 43 | 4-hexyl resorcinol diglycidyl ether | 4-ethyl resorcinol | 150 | 20 | 235,500/42 | 357 | −16 |
| Example 44 | 4-hexyl resorcinol diglycidyl ether | 2-n-propyl resorcinol | 150 | 20 | 96,749/34 | 342 | −20 |
| Example 45 | 4-hexyl resorcinol diglycidyl ether | 4-hexyl resorcinol | 150 | 20 | 68,250/33 | 361 | −22 |
| Example 46 | 4-hexyl resorcinol diglycidyl ether | tert-butyl hydroquinone | 150 | 20 | 352,500/41 | 353 | −15 |
| Example 47 | 5-pentyl resorcinol diglycidyl ether | tert-butyl hydroquinone | 145 | 4 | N/M/34 | 391 | −12 |
| Example 48 | 5-pentyl resorcinol diglycidyl ether | 4-ethyl resorcinol | 150 | 4 | 353,250/38 | 374 | −16 |
| Example 49 | 5-pentyl resorcinol diglycidyl ether | 2-n-propyl resorcinol | 150 | 4 | 243,000/38 | 347 | −19 |
| Example 50 | 5-pentyl resorcinol diglycidyl ether | 4-hexyl resorcinol | 145 | 4 | 133,500/28 | 366 | −21 |
| Example 51 | 4-ethyl resorcinol diglycidyl ether | 4-ethyl resorcinol | 170 | 7 | */54 | 328 | 3.7 |
| Example 52 | 4-ethyl resorcinol diglycidyl ether | 2-n-propyl resorcinol | 150 | 7 | N/M/45 | 314 | −3.8 |
| Example 53 | 4-ethyl resorcinol diglycidyl ether | 4-hexyl resorcinol | 170 | 7 | N/M/40 | 319 | −10 |
| Example 54 | 4-ethyl resorcinol diglycidyl ether | tert-butyl hydroquinone | 150 | 7 | N/M/59 | 309 | 2.7 |
| Example 55 | tert-butyl hydroquinone diglycidyl ether | 4-ethyl resorcinol | 175 | 7 | */49 | 310 | 10.2 |
| Example 56 | tert-butyl hydroquinone diglycidyl ether | 4-hexyl resorcinol | 175 | 7 | */28 | 328 | 5.3 |
| Example 57 | 2-n-propyl resorcinol diglycidyl ether | 4-ethyl resorcinol | 170 | 5 | 787,500/Not run | 323 | −5.3 |
| Example 58 | 2-n-propyl resorcinol diglycidyl ether | tert-butyl hydroquinone | 150 | 5 | N/M/Not Run | 321 | −3.5 |
| Example 59 | 4-(2-octyl) resorcinol diglycidyl ether | 4-ethyl resorcinol | 185 | 5 | 247,500/Not run | 364 | −14.29 |

TABLE VI-continued

| Heterogeneous Advanced Epoxy Resin | Mononuclear aromatic diglycidyl Ether | Diphenol | Reaction Temperature (° C.) | Reaction Time (Hours) | Viscosity (centipoise) Pure/Solution | EEW | Tg (° C.) |
|---|---|---|---|---|---|---|---|
| | Mononuclear aromatic diglycidyl ether:Diphenol Molar Ratio (2.5:1) | | | | | | |
| Example 60 | 4-(2-octyl) resorcinol diglycidyl ether | 4-hexyl resorcinol | 185 | 5 | 74,250/Not run | 365 | −23 |
| Example 61 | 4-(2-octyl) resorcinol diglycidyl ether | tert-butyl hydroquinone | 180 | 5 | 432,000/Not run | 344 | −11.11 |
| Example 62 | 4-styryl resorcinol diglycidyl ether | 4-hexyl resorcinol | 185 | 5 | Not run/Not run | 358 | 8.64 |
| Example 63 | 4-hexyl resorcinol diglycidyl ether | 4,4'-bisphenol A | 170 | 20 | NM/— | 367 | −11 |
| Example 64 | 4-hexyl resorcinol diglycidyl ether | 4,4'-bisphenol F | 170 | 20 | 239,250/45 | 356 | −16 |
| Example 65 | 4-hexyl resorcinol diglycidyl ether | hydroquinone | 170 | 20 | 117,750/39 | 335 | −21 |
| Example 66 | 5-pentyl resorcinol diglycidyl ether | 2-n-propyl resorcinol | 150 | 4 | 243,000/38 | 347 | −19 |
| Example 67 | 5-pentyl resorcinol diglycidyl ether | tert-butyl hydroquinone | 145 | 4 | NM/34 | 391 | −12 |
| Example 68 | 5-pentyl resorcinol diglycidyl ether | 4,4'-bisphenol A | 150 | 4 | NM/39 | 397 | −9 |
| Example 69 | 5-pentyl resorcinol diglycidyl ether | 4,4'-bisphenol F | 145 | 4 | 506,250/23 | 356 | −12 |

*Indicates reaction product was a viscous glass at 25° C. and viscosity was not measured.
(N/M) Indicates reaction product was a liquid, but viscosity was too high to measure with Brookfield CAP 2000+ viscometer.

The data in Table VI show that for Examples 43-46, 48-50, 57, 64-66, and 69 a heterogeneous advanced epoxy resin with a measureable viscosity (as measured with a Brookfield CAP 2000+ viscometer) was provided. Additionally, Examples that provided a heterogeneous advanced epoxy resin that was a viscous glass and did not have a measureable viscosity provided a Tg that is similar or lower to the Tg provided in Comparative Examples E and F. This suggests that the heterogeneous advanced epoxy resins that provided a viscous glass have a higher predisposition to be in a liquid phase than Comparative Examples E and F. Although Comparative Example F is heterogeneous (e.g., bisphenol F diglycidyl ether and 4,4'-bisphenol A), bisphenol F diglycidyl ether is not a mononuclear aromatic diglycidyl ether. As such, Examples 43-69 will provide a viscosity that is suitable for application when combined with a similar and/or lesser amount of solvent than Comparative Examples E and F. In addition, the data in Table V show that when a solvent was added to Examples 43-56 and Examples 64-69 to form a solution, a viscosity in a range from 23 to 59 was obtained, which is lower than the viscosity obtained for Comparative Examples E and F.

What is claimed:

1. A heterogeneous advanced epoxy resin formed by reacting a mononuclear aromatic diglycidyl ether and a diphenol in a molar ratio of the mononuclear aromatic diglycidyl ether to the diphenol in a range from 1.5 to 1.0 to 5.0 to 1.0, wherein the mononuclear aromatic diglycidyl ether is selected from the group consisting of an alkyl hydroquinone diglycidyl ether, an alkyl resorcinol diglycidyl ether, an alkyl catechol diglycidyl ether, and combinations thereof.

2. The heterogeneous advanced epoxy resin of claim 1, wherein the mononuclear aromatic diglycidyl ether is selected from the group consisting of 4-hexyl resorcinol diglycidyl ether, 5-pentyl resorcinol diglycidyl ether, 4-ethyl resorcinol diglycidyl ether, tert-butyl resorcinol diglycidyl ether, 2-n-propyl resorcinol diglycidyl ether, 4-(2-octyl) resorcinol diglycidyl ether, and 4-styryl resorcinol diglycidyl ether.

3. The heterogeneous advanced epoxy resin of claim 1, wherein the diphenol is selected from the group consisting of an alkyl hydroquinone, an alkyl resorcinol, an alkyl catechol, and combinations thereof.

4. The heterogeneous advanced epoxy resin of claim 3, wherein the diphenol is selected from the group consisting of 4-ethyl resorcinol, 4-hexyl resorcinol, 2-n-propyl resorcinol, and tert-butyl hydroquinone.

5. The heterogeneous advanced epoxy resin of claim 3, wherein an alkyl group of the diphenol is a substituted or unsubstituted alkyl having 2 to 18 carbons.

6. The heterogeneous advanced epoxy resin of claim 1, wherein an alkyl group of the mononuclear aromatic diglycidyl ether is a substituted or unsubstituted alkyl group having 2 to 18 carbons.

7. The heterogeneous advanced epoxy resin of claim 1, wherein the mononuclear aromatic diglycidyl ether and the diphenol are reacted at a temperature in a range from 135 degrees Celsius (° C.) to 250° C.

8. The heterogeneous advanced epoxy resin of claim 1, wherein the molar ratio of the mononuclear aromatic diglycidyl ether to the diphenol is 2.5 to 1.0.

9. The heterogeneous advanced epoxy resin of claim 1, wherein the heterogeneous advanced epoxy resin has an epoxide equivalent weight (EEW) in a range from 180 to 750 grams/equivalent (g/eq).

10. The heterogeneous advanced epoxy resin of claim 1, wherein the EEW is in a range from 200 to 500 g/eq.

11. The heterogeneous advanced epoxy resin of claim 1, wherein the heterogeneous advanced epoxy resin is a flowable liquid at 25° C.

12. The heterogeneous advanced epoxy resin of claim 11, wherein the viscosity of the heterogeneous advanced epoxy resin is less than 100,000 centipoise at 25° C.

* * * * *